US012718994B2

(12) United States Patent
Lee et al.

(10) Patent No.: US 12,718,994 B2
(45) Date of Patent: Aug. 25, 2026

(54) BUTTON ASSEMBLY AND ELECTRONIC APPARATUS COMPRISING SAME

(71) Applicant: Samsung Electronics Co., Ltd., Suwon-si (KR)

(72) Inventors: Sangho Lee, Suwon-si (KR); Geunyong Park, Suwon-si (KR); Sangjin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 472 days.

(21) Appl. No.: 18/354,060

(22) Filed: Jul. 18, 2023

(65) Prior Publication Data

US 2023/0360867 A1 Nov. 9, 2023

Related U.S. Application Data

(63) Continuation of application No. PCT/KR2022/001269, filed on Jan. 25, 2022.

(30) Foreign Application Priority Data

Feb. 5, 2021 (KR) ........................ 10-2021-0017074

(51) Int. Cl.
*H01H 13/10* (2006.01)
*H01H 13/14* (2006.01)
*H01H 13/26* (2006.01)

(52) U.S. Cl.
CPC ............ *H01H 13/10* (2013.01); *H01H 13/14* (2013.01); *H01H 13/26* (2013.01)

(58) Field of Classification Search
CPC ........ H01H 13/10; H01H 13/14; H01H 13/26; H01H 2221/03; H01H 2221/064; H01H 2223/004; H01H 3/12
See application file for complete search history.

(56) References Cited

U.S. PATENT DOCUMENTS 6,969,815 B1 * 11/2005 Lu ........................ H01H 13/705 200/345
7,586,053 B2 * 9/2009 Kim ........................ G05G 1/02 200/310
2007/0039811 A1 2/2007 Yanai et al.

FOREIGN PATENT DOCUMENTS

JP 2006-190516 A 7/2006
JP 2014-056680 A 3/2014
(Continued)

OTHER PUBLICATIONS

Request for the Submission of an Opinion dated Jan. 16, 2025, in connection with Korean Application No. 10-2021-0017074, 10 pages.

(Continued)

*Primary Examiner* — Lheiren Mae A Caroc

(57) ABSTRACT

A button assembly includes: a printed circuit board to which a contact switch is connected; a button member that receives an external force and presses the contact switch; and a support frame that is disposed on the front surface of the printed circuit board and includes a mounting hole to which the button member is mounted, wherein the button member includes a pressing projection for selectively pressing the contact switch through the mounting hole, and the support frame includes a support member that is disposed in the center of the mounting hole and selectively supports the rear surface of the button member and an elastic leg that elastically connects the support member and the inner surface of the mounting hole.

14 Claims, 9 Drawing Sheets

(56) References Cited

FOREIGN PATENT DOCUMENTS

| | | | |
|---|---|---|---|
| KR | 10-0376168 | B1 | 3/2003 |
| KR | 10-2006-0026944 | A | 3/2006 |
| KR | 10-0580297 | B1 | 5/2006 |
| KR | 10-0608948 | B1 | 8/2006 |
| KR | 10-2008-0029509 | A | 4/2008 |
| KR | 10-1111508 | B1 | 3/2012 |
| KR | 10-1369418 | B1 | 9/2014 |
| KR | 10-2081726 | B1 | 4/2020 |
| KR | 10-2210572 | B1 | 2/2021 |

OTHER PUBLICATIONS

International Search Report and Written Opinion of the International Searching Authority dated May 19, 2022, in connection with International Application No. PCT/KR2022/001269, 10 pages.

* cited by examiner

BUTTON ASSEMBLY AND ELECTRONIC APPARATUS COMPRISING SAME

CROSS-REFERENCE TO RELATED APPLICATIONS

This application is a Bypass Continuation of International Application No. PCT/KR2022/001269, filed Jan. 25, 2022, which claims priority to Korean Patent Application No. 10-2021-0017074, filed Feb. 5, 2021, the disclosures of which are herein incorporated by reference in their entirety.

BACKGROUND

1. Field

The disclosure relates to a button assembly and an electronic apparatus comprising the same. More particularly, the disclosure relates to a button assembly that softens an impact applied to a printed circuit board by limiting a movement range of a button that presses a tact switch installed on the printed circuit board, and an electronic apparatus comprising the same.

2. Description of Related Art

A tact switch is a switch configured to open and close a point of contact (contact point) by pressing a button, and is used in controlling an operation of an electronic apparatus by being applied to a control panel of a variety of electronic apparatuses. Power switches of home appliances, such as a microwave, may also be configured by applying the tact switch as described above.

SUMMARY

The disclosure is to address the above-mentioned problem, and an object of the disclosure is in providing a button assembly that prevents excessive impact from being applied to a tact switch and a printed circuit board even if an excessive load is placed on a button through a structure of a support frame that limits a movement range of the button that presses the tact switch installed on the printed circuit board and an electronic apparatus comprising the same.

According to one or more embodiments of the disclosure, a button assembly includes a printed circuit board to which a tact switch is connected, a button member configured to press the tact switch by receiving an external force, and a support frame disposed at a front surface of the printed circuit board and including a mounting hole to which the button member is mounted, and the button member includes a pressing protrusion configured to selectively press the tact switch passing through the mounting hole, and the support frame includes a support member disposed at a center of the mounting hole and configured to selectively support a rear surface of the button member, and an elastic leg configured to elastically connect the support member with an inner surface of the mounting hole.

The button member may include a support protrusion protruded and formed from the rear surface of the button member toward the support member, and the support member may include a support rib configured to contact with and support the support protrusion based on pressing the button member.

The elastic leg may be extended and formed from the support member in a helical form.

The button member may include a catching protrusion formed to protrude toward a side of the support frame, and the support frame may include a catching hole through which the catching protrusion is hook fastened.

The support frame may include a cover formed to encase a rear direction of an area at which the catching protrusion is fastened with the catching hole.

The support frame may include a drain hole formed at a lower part of the mounting hole and configured to discharge a foreign material that is introduced inside the mounting hole.

The support frame may include a support surface formed along an inner circumferential surface of the mounting hole, and configured to support an edge area of the rear surface of the button member based on pressing the button member.

The pressing protrusion may be formed to have a cross-section in a cross (t) shape, and the support frame may correspond to a shape of the pressing protrusion and include a pressing hole through which the pressing protrusion is passed through.

The support protrusion may be formed to have a cross-section in a cross (t) shape, and the support member may include a guide groove corresponding to a shape of the support protrusion.

The support surface may be injection molded integrally with the support member and the elastic leg.

The support frame may include a mounting groove configured to guide a movement of the button member by being formed to correspond to a shape of the button member.

The mounting hole, the support member, and the elastic leg may be formed at a bottom surface of the mounting groove.

The button member may include a first pressing protrusion and a second pressing protrusion, and the first pressing protrusion and the second pressing protrusion may be disposed symmetrically based on a center of the rear surface of the button member, and the first pressing protrusion and the second pressing protrusion may be configured to selectively press a first tact switch and a second tact switch disposed on the printed circuit board, respectively.

The button member may include three catching protrusions, and the support frame may include three catching holes formed at positions corresponding to each of the catching protrusions, and the three catching protrusions may be hook fastened to the catching holes disposed at positions corresponding thereto, respectively.

According to one or more embodiments of the disclosure, an electronic apparatus includes a main body, a control panel disposed at a front surface of the main body and configured to receive input of a user command that executes at least one from among functions provided by the electronic apparatus, and at least one button assembly included (e.g., comprised) in the control panel, and the button assembly includes a printed circuit board connected to a tact switch, a button member configured to press the tact switch by receiving an external force, and a support frame disposed at a front surface of the printed circuit board and including a mounting hole in which the button member is mounted, and the button member includes a pressing protrusion configured to selectively press the tact switch by passing through the mounting hole, and the support frame includes a support member disposed at a center of the mounting hole and configured to selectively support a rear surface of the button member, and an elastic leg elastically connecting the support member with an inner surface of the mounting hole.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
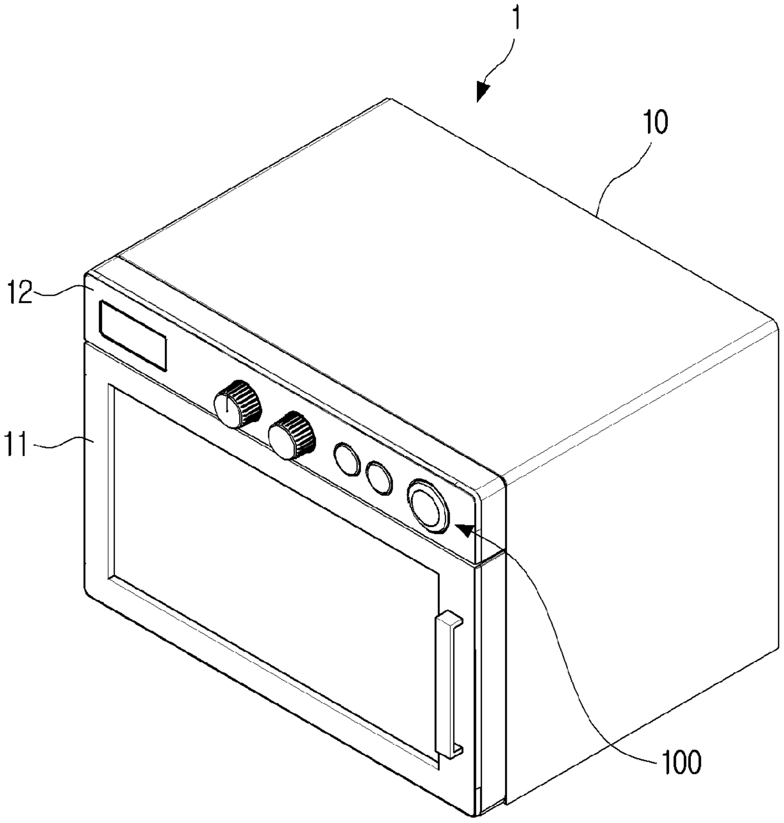
FIG. 1 illustrates an electronic apparatus according to one or more embodiments of the disclosure.
Figure 2:
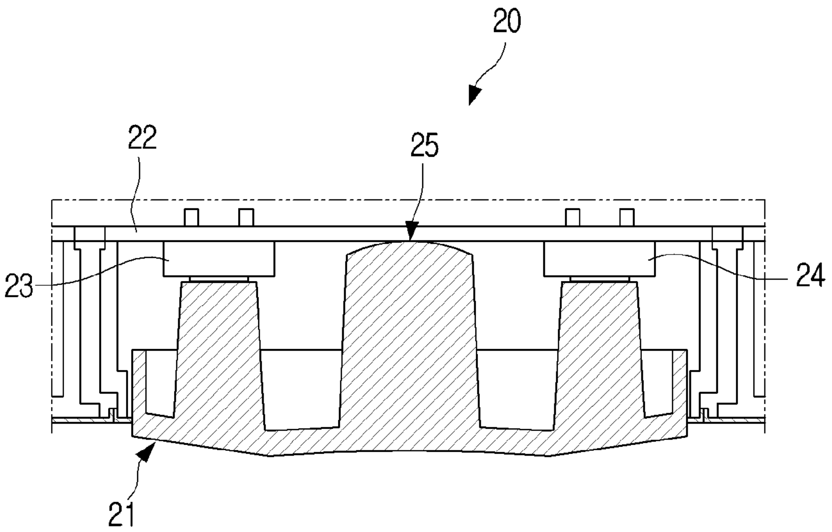
FIG. 2 illustrations a cross-sectional view of a button assembly.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

One or more embodiments described herein are example embodiments to assist in the understanding of the disclosure, and it is to be understood that the disclosure may be variously modified and implemented unlike the embodiments described herein. However, in case it is determined that, in describing the embodiments, detailed descriptions of related known functions or elements may unnecessarily confuse the gist of the disclosure, the detailed descriptions and illustrations will be omitted. In addition, the accompanied drawings may be shown enlarged in size rather than being shown to an actual scale to assist in the understanding of the disclosure.

Terms used in one or more embodiments of the disclosure are general terms selected considering their functions herein. However, these terms may vary depending on intention, legal or technical interpretation, emergence of new technologies, and the like of those skilled in the related art. In addition, there may be some terms arbitrarily selected. Such terms may be interpreted to the meaning defined in the disclosure, and if no specific definition of the term is provided, the term may be interpreted based on an overall context of the disclosure and based on a common technical sense in the corresponding technical field.

In describing the disclosure, an order of each step is to be understood as non-limiting unless the order of each step needs to be performed such that a preceding step must be performed logically and temporally prior to a following step. That is, except for exceptional cases as described above, even if a process described as the following step is performed preceding a process described as the preceding step, it does not influence the nature of the disclosure and the scope of protection should also be defined regardless of the order of the step.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

The terms such as "first," "second," and so on may be used to describe a variety of elements, but the elements should not be limited by these terms. The terms may be used for the purpose of distinguishing one element from another element. For example, a first element may be designated as a second element without departing from the scope and spirit of the present disclosure, and similarly, the second element may also be designated as the first element.

Further, because elements necessary in describing each embodiment of the disclosure are described in the disclosure, the one or more embodiments are not limited thereto.

Accordingly, some elements may be modified or omitted, and other elements may be added. In addition, the elements may be distributed and disposed to devices independent from one another.

Furthermore, although one or more embodiments of the disclosure have been described in detail below with reference to the accompanied drawings and the descriptions of the accompanied drawings, the disclosure is not limited to the embodiments.

The disclosure will be described in detail below with reference to the drawings.

FIG. 1 is a view schematically illustrating an electronic apparatus 1 according to one or more embodiments of the disclosure.

Referring to FIG. 1, the electronic apparatus 1 may include a main body 10, a door 11 configured to open and close an inner space of the main body 10, and a control panel 12.

The electronic apparatus 1 may be a variety of devices that provide service to a user by performing various functions. For example, the electronic apparatus 1 may be implemented as a microwave, an oven, an induction, a refrigerator, a washer, a dryer, an air purifier, a cleaner, a television (TV), a desktop personal computer (PC), a notebook, a smartphone, a tablet PC, a wearable device, and the like. However, the one or more embodiments are not limited thereto, and the electronic apparatus 1 may be any device so long as the electronic apparatus 1 is a device that can receive an input of a user through an input of a button. FIG. 1 shows an example of the electronic apparatus 1 being implemented as a microwave.

The control panel 12 may be disposed at a front surface of the main body 10 and receive input of a user command for executing at least one from among functions provided by the electronic apparatus 1. For example, the control panel 12 may include a plurality of buttons for receiving user input. The control panel 12 may raise user approachability by being disposed at the front surface of the main body 10.

The electronic apparatus 1 may perform, based on an electric signal that is generated according to contact of a physical button and a tact switch when an external force is applied to a button provided on the control panel 12, a function corresponding to a relevant button. In this case, the electronic apparatus 1 may receive a user command through a button assembly 100 provided in the control panel 12.

The button assembly 100 may include a button member which contacts with the tact switch as the button member is moved by receiving external force and a printed circuit board on which the tact switch is installed. Meanwhile, referring to FIG. 2, a button assembly 20 for operating a tact switch may include a button member 21 that is pressed by an external force, and tact switches 23 and 24 that operate when contacted by the pressed button member 21. Here, in order to prevent an excessive load from being applied to the tact switches 23 and 24 as external force is applied to the button member 21, a stopper 25 which is extended and formed from a rear surface of the button member 21 toward a side of a printed circuit board 22 may be provided. The button assembly 20 distributes the load that is applied to the tact switches 23 and 24 among the printed circuit board 22 by including the stopper 25 to prevent an excessive load from being applied to the tact switches 23 and 24 as external force is applied to the button member 21. The load that is applied to the tact switches 23 and 24 may be distributed among the printed circuit board 22. However, there has been a problem of a defect occurring due to the printed circuit board 22 being bent or damaged by the load applied to the printed circuit board 22 (e.g., load applied by the stopper 25).

Accordingly, the disclosure provides a button assembly that prevents an excessive impact from being applied to the tact switch and the printed circuit board even if an excessive load is placed on the button through a structure of a support frame that limits a movement range of the button member that presses the tact switch fixed on the printed circuit board. A structure of the button assembly 100 according to one or more embodiments of the disclosure will be described in detail below with reference to FIG. 3 to FIG. 9.

Figure 3:
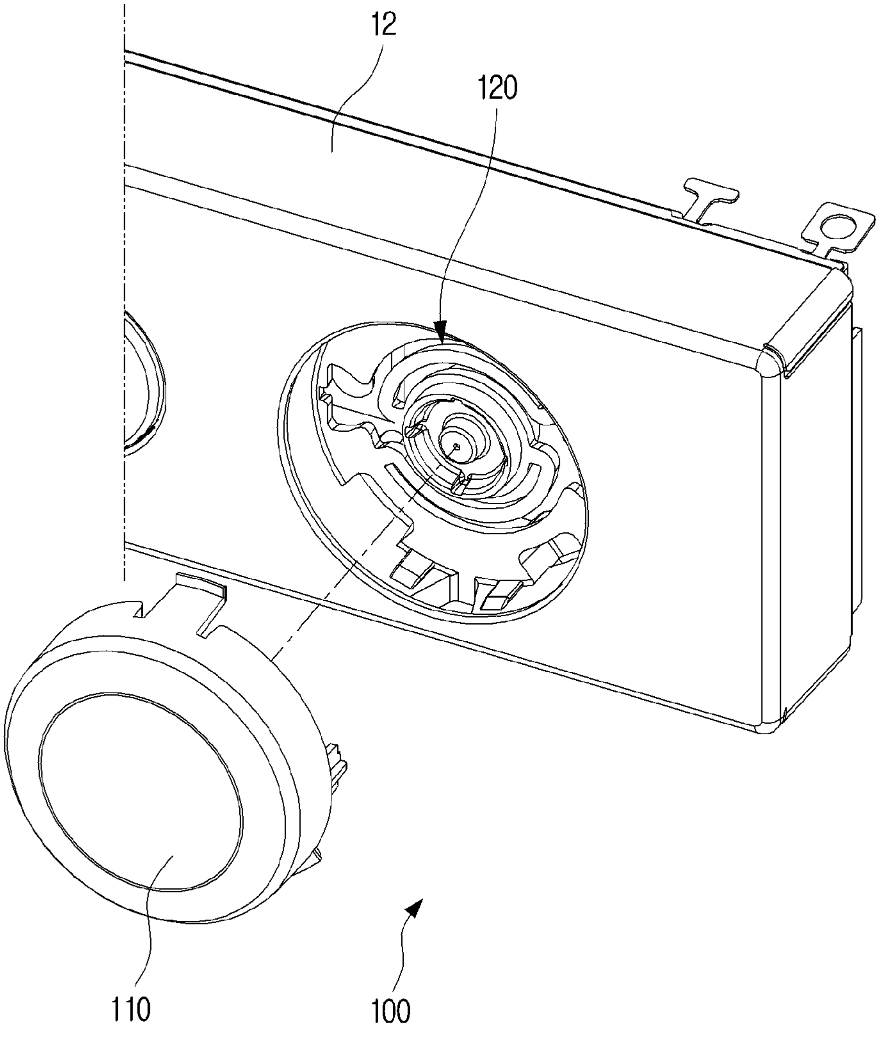
FIG. 3 illustrates a button member being detached from a support frame according to one or more embodiments of the disclosure.

FIG. 3 is a view showing a button member 110 detached from a support frame 120 to describe the button assembly 100 according to one or more embodiments of the disclosure.

Referring to FIG. 3, the support frame 120 may be provided inside the control panel 12, and the button member 110 may be installed such that the front surface is exposed toward an outer side of the control panel 12 so as to receive external force from an outside as the button member 110 is mounted to the support frame 120.

Figure 4:
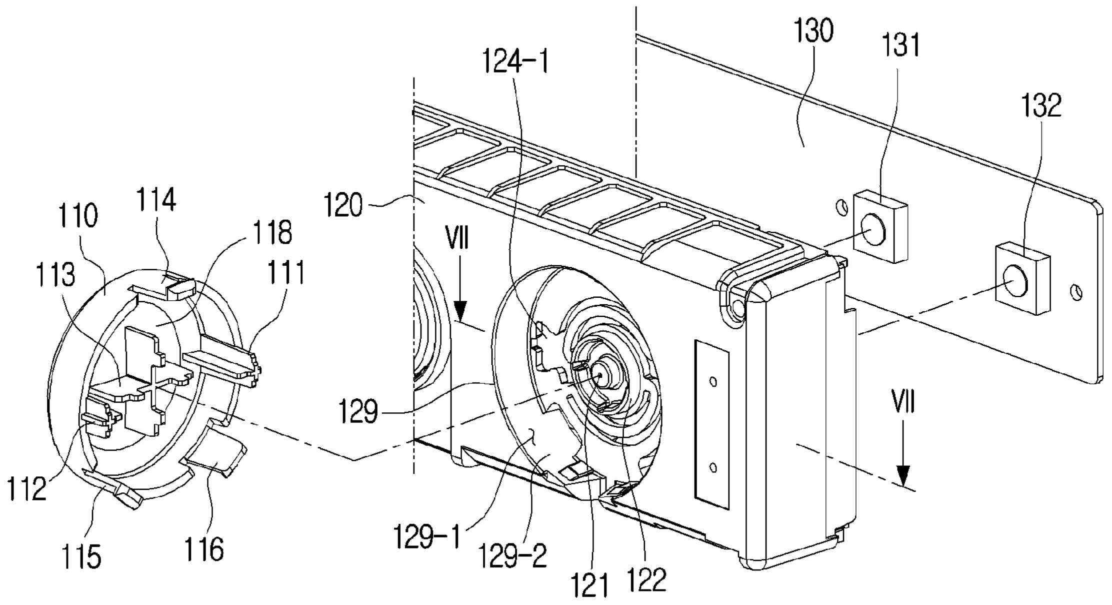
FIG. 4 illustrates an exploded perspective view of a button assembly according to one or more embodiments of the disclosure.
Figure 5:
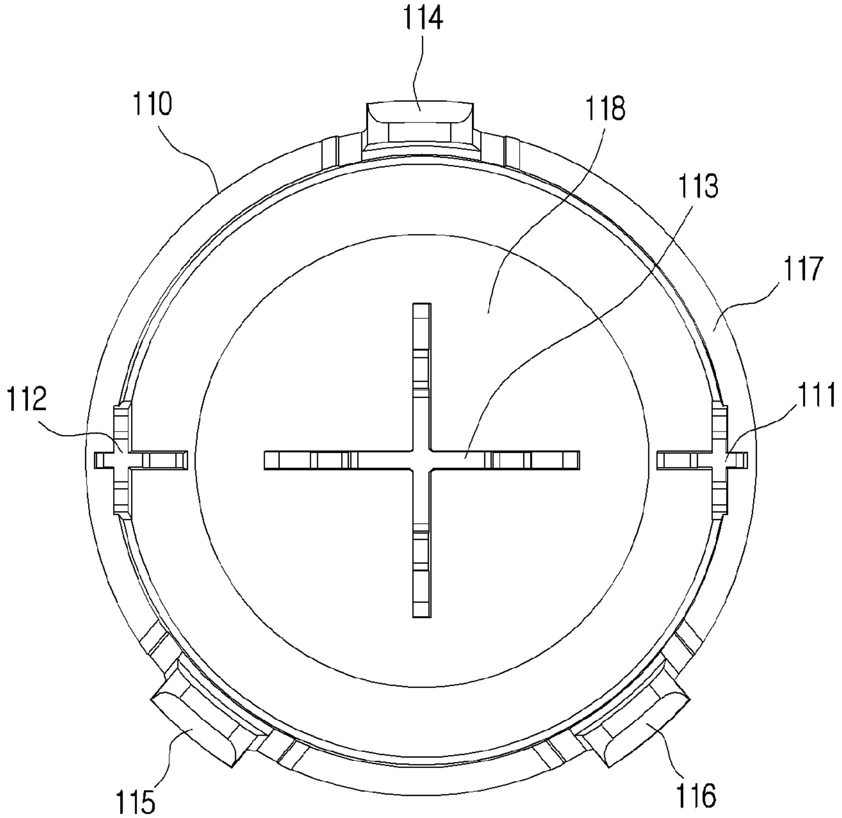
FIG. 5 illustrates a rear surface view of a button member according to one or more embodiments of the disclosure.
Figure 6:
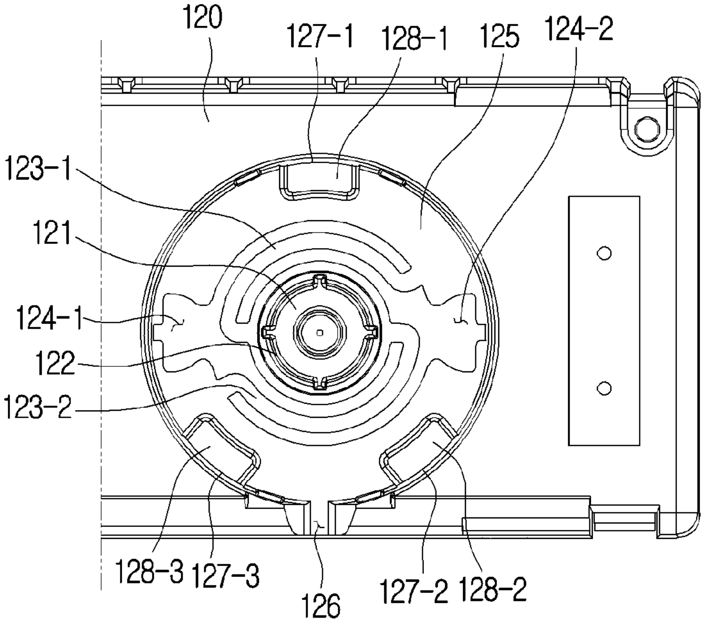
FIG. 6 illustrates a front view of a support frame according to one or more embodiments of the disclosure.

FIG. 4 is an exploded perspective view of the button assembly 100 according to one or more embodiments of the disclosure, FIG. 5 is a rear surface view of the button member 110 according to one or more embodiments of the disclosure, and FIG. 6 is a front view of the support frame 120 according to one or more embodiments of the disclosure.

Referring to FIG. 4, the button assembly 100 may include the button member 110 which receives external force and presses tact switches 131 and 132, a support frame 120 which is disposed at a front surface of a printed circuit board 130 and includes a mounting hole 129 in which the button member 110 is mounted, and a printed circuit board 130 connected with the tact switches 131 and 132.

The button member 110 may be mounted to the support frame 120 in a method of being inserted in the mounting hole 129 formed in the support frame 120. The button member 110 may receive external force after being mounted to the support frame 120 and generate an electric signal by pressing the tact switches 131 and 132 fixed to the printed circuit board 130 which is disposed at the rear surface of the support frame 120.

Referring to FIG. 4 and FIG. 5, the button member 110 may include pressing protrusions 111 and 112, a support protrusion 113, and catching protrusions 114, 115, and 116. Meanwhile, referring to FIG. 4 and FIG. 6, the support frame 120 may include a support member 121, a support rib 122, elastic legs 123-1 and 123-2, pressing holes 124-1 and 124-2, a support surface 125, a drain hole 126, catching holes 127-1, 127-2, and 127-3, and covers 128-1, 128-2, and 128-3.

The pressing protrusions 111 and 112 formed at the button member 110 may pass through the mounting hole 129 of the support frame 120 and selectively press the tact switches 131 and 132. The mounting hole 129 is configured to allow the button member 110 to pass through.

Referring to FIG. 4, the button member 110 may include a first pressing protrusion 111 and a second pressing protrusion 112 which are disposed symmetrically based on a center of the rear surface of the button member 110, and the first and second pressing protrusions 111 and 112 may respectively pass through a first pressing hole 124-1 and a second pressing hole 124-2 (referring to FIG. 6) formed at the support frame 120 and respectively press a first tact switch 131 and a second tact switch 132.

In this case, the pressing protrusions 111 and 112 may be formed to have a cross-section in a cross ( |˙ ) shape, and the pressing holes 124-1 and 124-2 may be formed to correspond respectively to the shapes of the pressing protrusions 111 and 112. Accordingly, when the button member 110 receives external force, a stable movement of the button member 110 may be guided as the pressing protrusions 111 and 112 are supported by the pressing holes 124-1 and 124-2 having a cross shape.

The support member 121 included in the support frame 120 may be disposed at a center of the mounting hole 129 and may selectively support the rear surface of the button member 110. Referring to FIG. 4, the button member 110 may include the support protrusion 113 which is protruded and formed from the rear surface 118 of the button member 110 toward the support member 121.

In this case, the support member 121 may include the support rib 122 which is protruded and formed from the support member 121 toward the front surface. The support rib 122 may support, based on an external force being applied to the button member 110, that is, the button member 110 being pressed, the button member 110 by contacting with the support protrusion 113 of the button member 110. Referring to FIG. 6, the support rib 122 may be formed in a circular shape to uniformly support the support protrusion 113 formed at the rear surface of the button member 110.

The support protrusion 113 may be formed to have a cross-section in a cross ( + ) shape, and the support member 121 may include a guide groove that corresponds to the shape of the support protrusion 113. For example, referring to FIG. 5 and FIG. 6, the support rib 122 may include a guide groove that can be fastened with the support protrusion 113 having a cross shape. Accordingly, when the button member 110 receives external force, the support protrusion 113 may guide the button member 110 to move in a certain direction as the support protrusion 113 is fastened to the guide groove of the support rib 122.

The elastic legs 123-1 and 123-2 may elastically connect the support member 121 with an inner surface of a mounting hole 129-1. Referring to FIG. 6, the elastic legs 123-1 and 123-2 may be extended and formed from the support member 121 in a helical form, and may be connected to the support surface 125 which is formed along an inner circumferential surface of the mounting hole 129-1.

The elastic legs 123-1 and 123-2 may be formed of a material having elasticity, and may provide a resilient force that restores the button member 110 to a position prior to pressing through a structure in a helical form that connects the support member 121 with an inner side surface of the support frame 120.

The support surface 125 may be formed along the inner circumferential surface of the mounting hole 129-1, and may support an edge area 117 (referring to FIG. 5) of the rear surface of the button member 110 when pressing the button member 110. For example, the support surface 125 presses the edge area 117 when the external force is applied upon the button member 110. Accordingly, as the button member 110 is firmly supported by the support surface 125 even if an excessive load is applied to the button member 110, the load may be prevented from being applied to the printed circuit board 130 positioned at the rear surface of the support frame 120 and the tact switches 131 and 132. Detailed descriptions associated therewith will be described below in FIG. 7.

Meanwhile, referring to FIG. 6, the support surface 125 may be injection molded integrally with the support member 121 and the elastic legs 123-1 and 123-2.

The support frame 120 may be formed to correspond to the shape of the button member 110 and include a mounting groove that guides a movement of the button member. For example, referring to FIG. 4, a mounting groove 129-2 may be formed to have a cylindrical shape that forms an exterior of the button member 110. Accordingly, the button member 110 may be guided to be stably mounted to the support frame 120, and the movement of the button member 110 may be guided if the button member 110 receives external force.

Meanwhile, when the mounting groove 129-2 is formed at the support frame 120, the mounting hole 129-1 that is formed such that the button member 110 is able to be in contact with the tact switches 131 and 132 by passing through the support frame 120 may be formed at a bottom surface of the mounting groove 129-2. In addition, the support member 121 may be formed, at a center of the bottom surface of the mounting groove 129-2, such that the elastic legs 123-1 and 123-2 are formed to connect the support member 121 from the bottom surface of the mounting groove 129-2 with the support surface 125 that form the bottom surface of the mounting hole 129-1.

The support frame 120 may be formed at a lower part of the mounting hole 129-1 and include a drain hole 126 for discharging foreign material introduced inside of the mounting hole 129-1. The foreign material such as water introduced to a gap between the button member 110 and the support frame 120 may move to the lower part of the mounting hole 129-1 and be discharged to an outside through the drain hole 126. Accordingly, durability of the button assembly 100 may be enhanced by preventing water from being introduced to the printed circuit board 130 disposed at the rear surface of the support frame 120.

The button member 110 may be coupled to the support frame 120 in a hook fastening method. Referring to FIG. 4 to FIG. 6, the button member 110 may include the catching protrusions 114, 115, and 116 which are formed to be protruded toward a side of the support frame 120, and the support frame 120 may include the catching holes 127-1, 127-2, and 127-3 through which the catching protrusions 114, 115, and 116 can be hook fastened. Detailed descriptions associated with a hook fastening structure of the button member 110 and the support frame 120 will be described below in FIG. 8 to FIG. 9.

Figure 7:
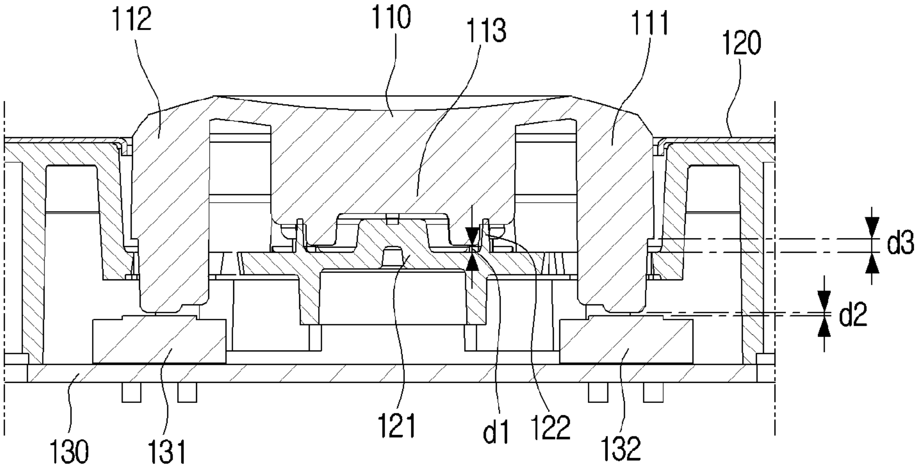
FIG. 7 illustrates a cross-sectional view taken along VII-VII in FIG. 4.

FIG. 7 is a cross-sectional view taken along VII-VII in FIG. 4.

FIG. 7 is a view showing the button member 110 and the support member 121 being fastened in a state in which an external force is not applied.

Referring to FIG. 7, when the button member 110 is pressed, the support rib 122 may support the support protrusion 113 such that the button member 110 is no longer pressed when the button member 110 is pressed greater than or equal to a first distance d1. For example, the support rib 122 may support the support protrusion 113 such that the button member 110 is no longer pressed by greater than or equal to 0.6 mm. In this case, because the support rib 122 is connected to the support frame 120 through the elastic legs 123-1 and 123-2, the support protrusion 113 may be flexibly supported through the resilient force of the elastic legs 123-1 and 123-2.

Meanwhile, a distance d2 between the pressing protrusions 111 and 112 and the tact switches 131 and 132 may be designed to be 0.7 mm, and an upper limit (e.g., maximum) pressing distance of the tact switches 131 and 132 may be designed to be 0.5 mm. That is, the tact switches 131 and 132 may operate if the pressing protrusions 111 and 112 are pressed between 0.7 mm and 1.2 mm (value of adding d2 and a lower limit (e.g., maximum) pressing distance), and an unnecessary load may be applied to the tact switches 131 and 132 if pressed by greater than or equal to 1.2 mm.

In this case, a second distance d3 between the support surface 125 (referring to FIG. 6) of the support frame and the edge area 117 (referring to FIG. 5) of the rear surface of the button member may be designed to be 1.2 mm, and as the edge area 117 of the rear surface of the button member is firmly supported by the support surface 125 despite an excessive load being applied to the button member 110, the pressing protrusions 111 and 112 may be made to not press the tact switches 131 and 132 by greater than or equal to 1.2 mm. Accordingly, the tact switches 131 and 132 and the printed circuit board 130 may be prevented from being damaged or failing due to the excessive load applied to the button member 110.

Figure 8:
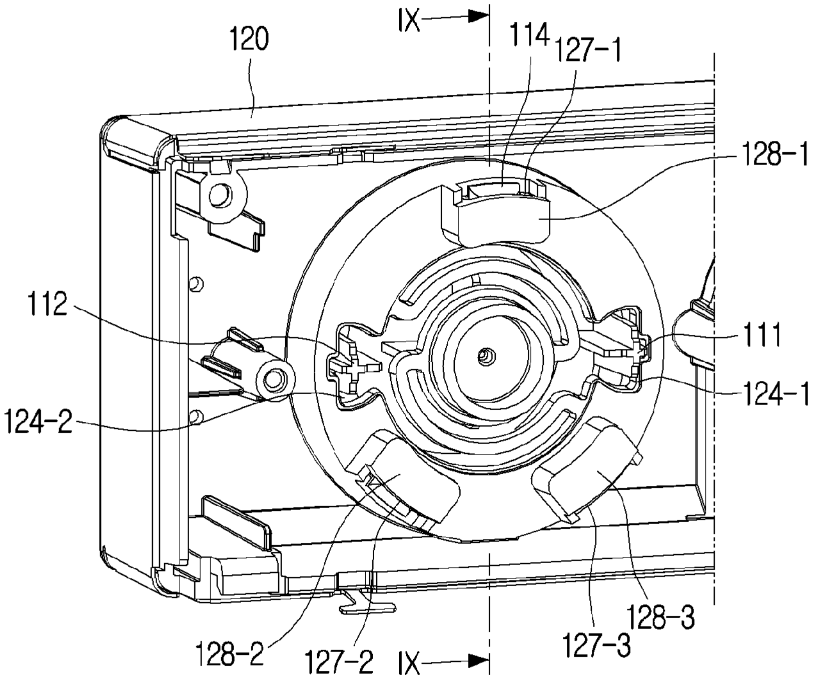
FIG. 8 illustrates a rear surface view illustrating a button member being mounted to a support frame according to one or more embodiments of the disclosure.
Figure 9:
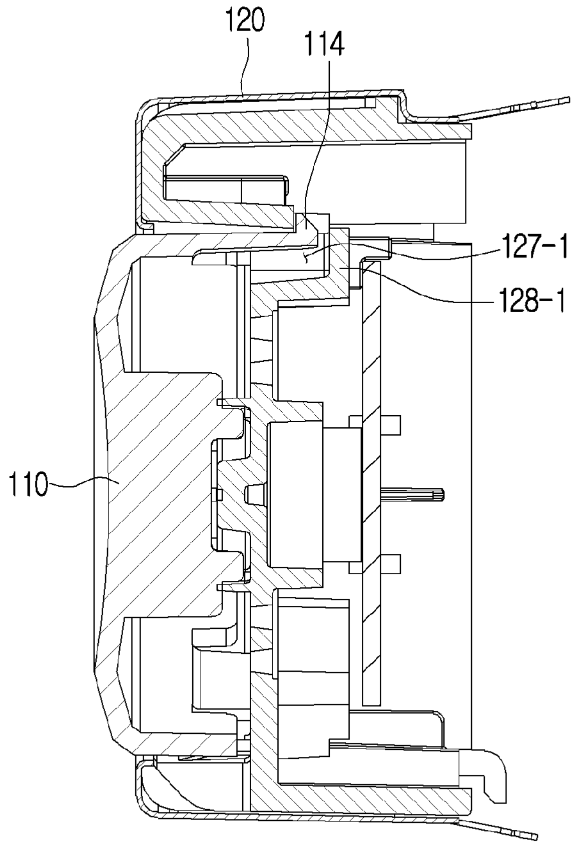
FIG. 9 illustrates a cross-sectional view taken along IX-IX in FIG. 8.

FIG. 8 is a rear surface view illustrating the button member 110 being mounted to the support frame 120 according to one or more embodiments of the disclosure, and FIG. 9 is a cross-sectional view taken along IX-IX in FIG. 8.

The button member 110 may be coupled with the support frame 120 through a method of hook fastening by inserting the catching protrusions 114, 115, and 116 which are formed to protrude toward the support frame 120 in the catching holes 127-1, 127-2, and 127-3 of the support frame 120.

In this case, the support frame 120 may include the covers 128-1, 128-2, and 128-3 that are formed to encase a rear direction of an area at which the catching protrusions 114, 115, and 116 are fastened with the catching holes 127-1, 127-2, and 127-3. The covers 128-1, 128-2, and 128-3 may partially block a space that is communicated toward the rear direction of the catching holes 127-1, 127-2, and 127-3, that is, the printed circuit board 130. Accordingly, durability of the button assembly 100 may be improved by preventing foreign material such as water which is introduced from the outside through the catching holes 127-1, 127-2, and 127-3 from being introduced to the printed circuit board 130 and the tact switches 131 and 132.

Meanwhile, the introduced foreign material may move to the lower part of the mounting hole 129-1 due to gravity and discharged to the outside through the drain hole 126.

While the disclosure has been shown and described with reference to the exemplary embodiments thereof, the disclosure is not limited to the embodiments specifically described and various modifications may be made therein by those skilled in the art to which this disclosure pertains without departing from the spirit and scope of the disclosure, and such modifications shall not be understood as separate from the technical concept or outlook of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A button assembly, comprising:

a printed circuit board;

a tact switch connected to the printed circuit board;

a button member configured to press the tact switch by receiving an external force upon the button member; and a support frame disposed at a front surface of the printed circuit board and comprising a mounting hole configured to allow the button member to pass through, wherein the button member comprises a pressing protrusion configured to selectively press the tact switch by passing through the mounting hole, wherein the support frame comprises:

a support member disposed at a center of the mounting hole and configured to selectively support a rear surface of the button member; and an elastic leg configured to elastically connect the support member with an inner surface of the mounting hole, wherein the button member comprises a support protrusion protruded and formed from the rear surface of the button member toward the support member, wherein the support member comprises a support rib configured to contact with and support the support protrusion based on pressing the button member, wherein the button member comprises a catching protrusion formed to protrude toward a side of the support frame, wherein the support frame comprises a catching hole through which the catching protrusion is configured to hook fasten, wherein the support frame comprises:

a cover formed to encase a region behind an area at which the catching protrusion is configured to hook fasten with the catching hole, wherein the support protrusion is formed to include a cross-section in a cross shape; and wherein the support member comprises a guide groove corresponding to a shape of the support protrusion.

2. The button assembly of claim 1, wherein the elastic leg extends from the support member and is formed in a helical form.

3. The button assembly of claim 1, wherein the support frame comprises:

a drain hole formed at a lower part of the mounting hole and configured to discharge a foreign material that is introduced inside the mounting hole.

4. The button assembly of claim 1, wherein the support frame comprises:

a support surface formed along an inner circumferential surface of the mounting hole, and configured to support an edge area of the rear surface of the button member based on pressing the button member.

5. The button assembly of claim 4, wherein the support surface is injection molded integrally with the support member and the elastic leg.

6. The button assembly of claim 1, wherein:

the pressing protrusion is formed to include a cross-section in a cross shape; and the support frame corresponds to a shape of the pressing protrusion and comprises a pressing hole through which the pressing protrusion is configured to pass through.

7. The button assembly of claim 1, wherein the support frame comprises a mounting groove formed to correspond to a shape of the button member and configured to guide a movement of the button member.

8. The button assembly of claim 7, wherein the mounting hole, the support member, and the elastic leg are formed at a bottom surface of the mounting groove.

9. The button assembly of claim 1, wherein:

the button member comprises a first pressing protrusion and a second pressing protrusion;

the first pressing protrusion and the second pressing protrusion are disposed symmetrically based on a center of the rear surface of the button member; and the first pressing protrusion and the second pressing protrusion are configured to selectively press a first tact switch and a second tact switch disposed on the printed circuit board, respectively.

10. The button assembly of claim 1, wherein:

the button member comprises three catching protrusions;

the support frame comprises three catching holes formed at positions corresponding to each of the catching protrusions; and the three catching protrusions are configured to hook fasten to the catching holes disposed at positions corresponding to the three catching protrusions, respectively.

11. An electronic apparatus comprising:

a main body;

a control panel disposed at a front surface of the main body and configured to receive input of a user command that executes at least one from among functions provided by the electronic apparatus; and a button assembly comprised in the control panel, wherein the button assembly comprises:

a printed circuit board;

a tact switch connected to the printed circuit board;

a button member configured to press the tact switch by receiving an external force upon the button member; and a support frame disposed at a front surface of the printed circuit board and comprising a mounting hole configured to allow the button member to pass through, wherein the button member comprises a pressing protrusion configured to selectively press the tact switch by passing through the mounting hole, wherein the support frame comprises:

a support member disposed at a center of the mounting hole and configured to selectively support a rear surface of the button member; and an elastic leg elastically connecting the support member with an inner surface of the mounting hole, wherein the button member comprises a support protrusion protruded and formed from the rear surface of the button member toward the support member, wherein the support member comprises a support rib configured to contact with and support the support protrusion based on pressing the button member, wherein the button member comprises a catching protrusion formed to protrude toward a side of the support frame, wherein the support frame comprises a catching hole through which the catching protrusion is configured to hook fasten, wherein the support frame comprises:

a cover formed to encase a region behind an area at which the catching protrusion is configured to hook fasten with the catching hole, wherein the support protrusion is formed to include a cross-section in a cross shape; and wherein the support member comprises a guide groove corresponding to a shape of the support protrusion.

12. The electronic apparatus of claim 11, wherein the elastic leg extends from the support member and is formed in a helical form.

13. A button assembly, comprising:

a button member configured to press a tact switch by receiving an external force upon the button member; and a support frame configured to be disposed at a front surface of a printed circuit board and comprising a mounting hole configured to allow the button member to pass through, wherein the button member comprises a pressing protrusion configured to selectively press the tact switch by passing through the mounting hole, wherein the support frame comprises:

a support member disposed at a center of the mounting hole and configured to selectively support a rear surface of the button member; and an elastic leg configured to elastically connect the support member with an inner surface of the mounting hole, wherein the button member comprises a support protrusion protruded and formed from the rear surface of the button member toward the support member, wherein the support member comprises a support rib configured to contact with and support the support protrusion based on pressing the button member, wherein the button member comprises a catching protrusion formed to protrude toward a side of the support frame, wherein the support frame comprises a catching hole through which the catching protrusion is configured to hook fasten, wherein the support frame comprises:

a cover formed to encase a region behind an area at which the catching protrusion is configured to hook fasten with the catching hole, wherein the support protrusion is formed to include a cross-section in a cross shape; and wherein the support member comprises a guide groove corresponding to a shape of the support protrusion.

14. The button assembly of claim 13, further comprising:

the tact switch configured to connect to the front surface of the printed circuit board, wherein the elastic leg extends from the support member and is formed in a helical form.

* * * * *